US009350565B1

(12) United States Patent
Vosshall et al.

(10) Patent No.: US 9,350,565 B1
(45) Date of Patent: May 24, 2016

(54) METHOD AND SYSTEM FOR RELIABLE DISTRIBUTION OF MESSAGES

(75) Inventors: Peter Sven Vosshall, Seattle, WA (US); Alan Stewart Robbins, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2835 days.

(21) Appl. No.: 10/685,729

(22) Filed: Oct. 14, 2003

(51) Int. Cl.
*G06F 15/16* (2006.01)
*H04L 12/54* (2013.01)

(52) U.S. Cl.
CPC ..................................... *H04L 12/54* (2013.01)

(58) Field of Classification Search
CPC ....................................................... H04L 12/54
USPC .......................................................... 709/206
See application file for complete search history.

(56) References Cited

U.S. PATENT DOCUMENTS

| 4,725,834 | A | * | 2/1988 | Chang et al. ................... 370/451 |
| 5,036,518 | A | * | 7/1991 | Tseung ........................... 714/748 |
| 5,216,675 | A | * | 6/1993 | Melliar-Smith et al. ....... 714/748 |
| 5,596,318 | A | * | 1/1997 | Mitchell ....................... 340/7.22 |
| 5,736,933 | A | * | 4/1998 | Segal ........................... 340/7.22 |
| 5,799,146 | A | * | 8/1998 | Badovinatz et al. .............. 714/4 |
| 6,014,429 | A | * | 1/2000 | LaPorta et al. ............. 379/88.15 |
| 6,411,967 | B1 | | 6/2002 | Van Renesse |
| 6,724,770 | B1 | * | 4/2004 | Van Renesse ................. 370/432 |
| 6,980,518 | B1 | * | 12/2005 | Sun et al. ....................... 370/235 |
| 7,050,432 | B1 | * | 5/2006 | Banavar et al. ............... 370/390 |
| 2003/0132855 | A1 | * | 7/2003 | Swan ....................... 340/825.49 |
| 2006/0004884 | A1 | * | 1/2006 | Kling et al. .................... 707/202 |

* cited by examiner

*Primary Examiner* — June Sison
*Assistant Examiner* — Steven Nguyen
(74) *Attorney, Agent, or Firm* — Knobbe Martens Olson & Bear LLP

(57) ABSTRACT

A method and system for distributing messages sent from senders to receivers in a reliable and real-time manner. Some of the receivers are designated as recording receivers that are responsible for recording each message that it receives so it can provide to other receivers messages they have missed. When a sender distributes a message, it waits for an acknowledgement from a recorder that it received and recorded the message. If an acknowledgement is received, then the sender knows at least one recorder has a copy of the message that that recorder can provide to other receivers that missed the message. When a receiver detects that it missed a message, it then initiates a "hole filling" process that distributes a request for the missing message to the recorders. A recorder who can provide the missing message sends to the requesting receiver a response indicating it can provide the missing message.

44 Claims, 23 Drawing Sheets

METHOD AND SYSTEM FOR RELIABLE DISTRIBUTION OF MESSAGES

TECHNICAL FIELD

The described technology relates generally to the distribution of messages and more particularly to ensuring that each receiver receives all messages.

BACKGROUND

Many web sites are accessed by hundreds of thousands of users on a daily basis. To support such a large volume of access, many web sites typically are hosted on a large number of web servers. Each web server has the software and data needed to respond to each access. When a web site receives an access request, the request is distributed to one of the web servers for servicing. Various load-balancing techniques are used to help ensure that requests are serviced in a timely manner by a web server.

It is important that each web server has the same software and data so each request can be serviced in a uniform manner. For example, if users can purchase products through a web site, then each web server for that site would have access to a catalog of the available products that includes product descriptions and pricing information. Each web server may have access to its own copy of the catalog or a copy shared with some of the other web servers. If each copy of the catalog was not the same, then a user might receive different pricing information depending on the web server to which their request happens to be distributed. To prevent such undesirable inconsistencies, all copies of catalogs typically are updated at the same time and, because catalogs can be very large, they generally are updated only on a periodic basis. For example, the pricing information of a catalog may be updated once a day at the same time for each copy.

When the data on a web server is updated only periodically, there may be times when the data on the web server may not be what the web site operator wants because of the delay inherent in making only periodic updates. For example, if the pricing information for a catalog is only updated once a day, then the price of a given product cannot be changed more frequently to address market conditions. Thus, if a competitor of a web site lowers the price of a product just after the pricing information for that product has been updated in the catalog, the web site would need to wait 24 hours before lowering its price in response to the competitor's lower price.

Some data used by a web site changes so frequently that each web server cannot rely on its own copy of infrequently updated data. For example, the inventory for many products can change very rapidly as orders are placed and additional inventory is received. Typically, such data is stored at a central location (e.g., a database server) that is accessed by each web server as needed. The storage of such data at a central location, however, creates the possibility of a bottleneck that may slow the responsiveness of a web site as access to it increases. In addition, as access to a given web site increases, it might be prohibitively costly to increase the capacity of the web site to support additional web servers in part because the storage of data only at a central location is not particularly scalable.

It would be desirable to have a technique that would allow for each web server to have access to a local copy of the data to avoid bottlenecks, to have such data updated on a real-time basis, and to ensure that each copy of the data is relatively consistent.

DETAILED DESCRIPTION

Figure 1:
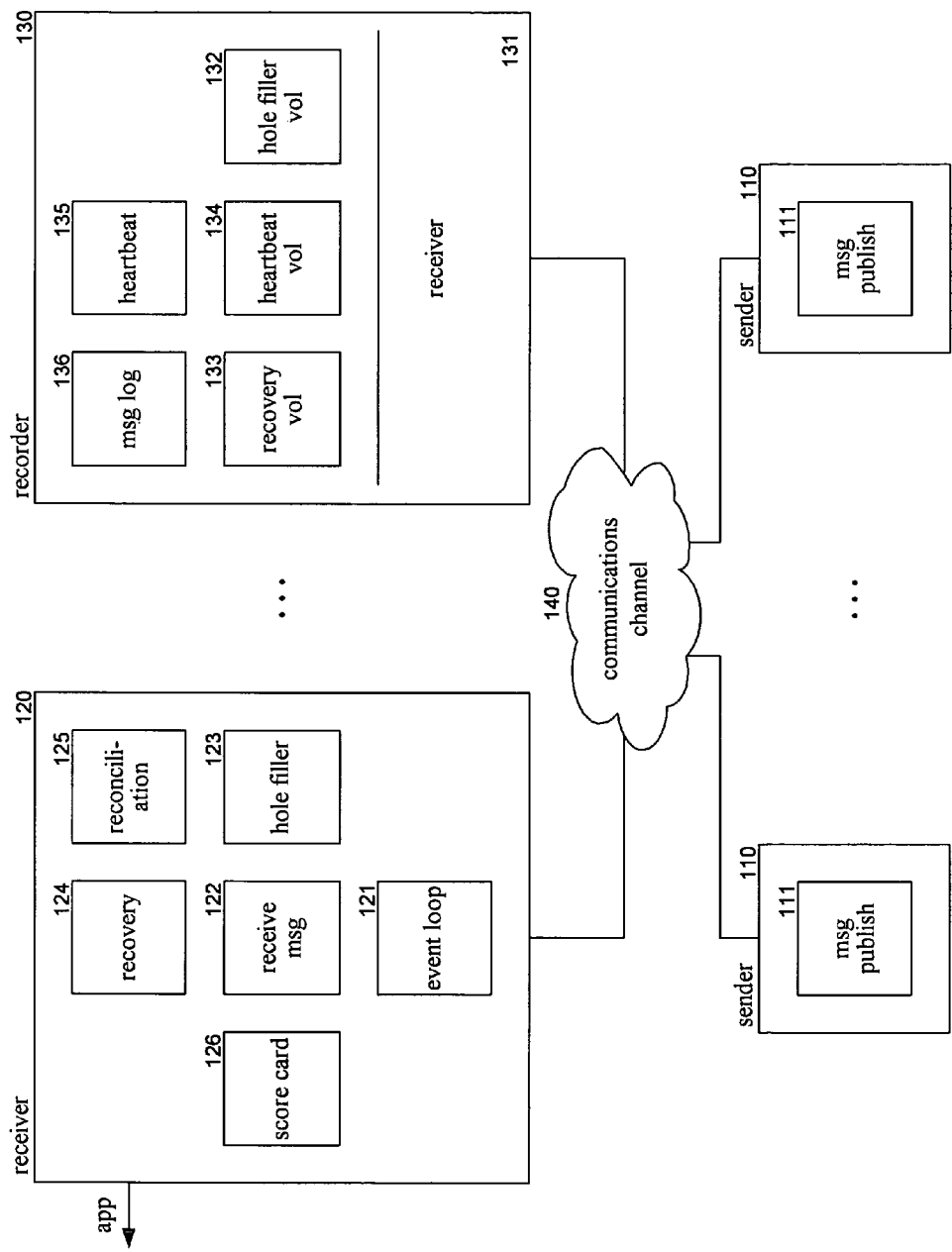
FIG. 1 is block diagram illustrating the message system in one embodiment.

A method and system for distributing messages sent from senders to receivers in a reliable and real-time manner is provided. In one embodiment, the message system distributes (e.g., via multicasting) messages from senders to receivers that have registered to receive the messages. The distribution of messages may use a publish/subscribe model. Some of the receivers are designated as recording receivers ("recorders") that are responsible for recording each message that it receives so it can provide to other receivers messages they have missed (e.g., due to a network failure). When a sender distributes a message, it waits for an acknowledgement from a recorder that it received and recorded the message. If an acknowledgement is received, then the sender knows at least one recorder has a copy of the message that that recorder can provide to other receivers that may have missed the message. If the sender does not receive an acknowledgement, it reports an error. In one embodiment, the sender does not send the next message until an acknowledgement is received for the prior message or until it is apparent that no acknowledgement will be received (e.g., a timeout occurs). When a receiver (recording or nonrecording) detects that it missed a message (e.g., a gap or hole in the sequence number of messages), it then initiates a "hole filling" process that distributes (e.g., via multicasting) a request for the missing message to the recorders. A recorder (i.e., a "volunteer") who can provide the missing message sends (e.g., via unicasting) to the requesting receiver a response indicating it can provide the missing message. The requesting receiver then selects one of the responding recorders and sends (e.g., via unicasting) to the selected recorder a request to provide the missing message. The selected recorder retrieves the missing message it recorded and sends (e.g., via unicasting) the message to the requesting receiver. The requesting receiver then processes the missing message. In this way, messages can be reliably distributed in real-time to receivers.

The message system can be implemented in a web server environment that supports a web site that has a catalog. The message system can be used to distribute updates (i.e., message content) to web servers that each have their own copy of a catalog. For example, a sender can receive from a catalog application updates (e.g., price changes) representing one or more changes to be made to the copies of the catalog. The sender packages the updates in a message and distributes the message to the web servers. When a web server receiver receives a message, it unpackages the updates contained in the message and provides the updates to an application that is responsible for updating the local copy of the catalog. If a receiver misses a message, it can request a recorder to provide the missing message and then provide the message to the application when it is received. If the sender does not receive an acknowledgement that a recorder received a message, it notifies the catalog application of the failure. The catalog application can then take an appropriate action such as asking the sender to redistribute the updates. Although the web servers are not guaranteed to receive a message at the same time, the web servers will receive messages at nearly the same time. In many environments, the advantages of such real-time updating of data outweigh the disadvantages of data inconsistency in the short-term.

In one embodiment, the message system groups messages into batches with each message being uniquely identified by a batch identifier and sequence number within the batch. The senders may generate batch identifiers using a random number generator—each generated number (e.g., a 128-bit number) can be considered with an extremely high probability to be unique. The senders assign sequence numbers to the messages of a batch sequentially starting at 1. Whenever a sender distributes a message that is not acknowledged as being received by a recorder, some of the receivers may have received the message and others may not have received the message. Because a recorder did not acknowledge receipt of the message, it is possible that a receiver that did not receive the message will not be able to get the missing message from a recorder. As a result of the lack of acknowledgement, the sender notifies the application that provided the content of the message, it terminates the batch, and it starts a new batch. Because the batch is terminated and no additional messages are sent with that batch number, the receivers that did not receive the unacknowledged message will not detect that a message is missing and request a recorder to provide the missing message. The receivers, however, may have inconsistent data because some of them may have received the unacknowledged message while others did not. In such a case, the application can take an appropriate action, such as redistributing the message content or distributing other message content requesting the undoing of the effects of the last message content.

In some situations, a receiver might not receive the last few (or any) messages of a given batch because a portion of the communications channel failed. In such situations, the receiver would not detect that it had missed a message because there would be no hole in the sequence numbers it had received. The message system allows a receiver to detect whether it missed such messages at the end of a batch by having the recorders distribute (e.g., via multicasting) periodic "heartbeats" to the receivers that contain the last sequence number for each "active" batch along with a timestamp for the latest message received. A batch is considered active if its sender has recently distributed messages for that batch. For example, a batch may be considered active if the last message of the batch was received within a certain period (e.g., in the last 2 hours). If no message for a batch has been received during that period, the batch is considered to be "inactive." When a receiver receives a heartbeat, it reconciles the messages it has received with the messages identified in the heartbeat. The reconciliation process involves the detection of holes (e.g., at the end of a batch) so they can be filled by the hole filling process.

If a computer system that is executing a receiver goes down or is otherwise unable to execute the receiver, the receiver will initiate a recovery process as part of its initialization. During recovery, a receiver requests a recorder to provide all messages with a timestamp later than a certain time. During initialization, the receiver uses the latest timestamp of a message that it received as the starting point for the recovery process. A receiver initiates the recovery process by distributing (e.g., via multicasting) to the recorders a request for a recovery volunteer. Each recorder that can help with the recovery sends (e.g., via unicasting) a response to the requesting receiver. The requesting receiver selects a recorder that responded and sends (e.g., via unicasting) to the selected recorder a request for recovery of data starting at a certain time. The request may indicate the number of messages to be provided in the response. Upon receiving the request, the recorder retrieves messages starting with the first message that has a timestamp greater than the corresponding time in the request. The recorder then sends (e.g., via unicasting) the retrieved messages in a single response to the requesting receiver. Upon receiving the response, the receiver processes each message in the same manner as if it had been received directly from the sender. The receiver may send another recovery data request to the recorder for the next set of messages and continue repeating the process until all the missed messages have been recovered. During recovery, a receiver may concurrently be receiving messages that continue to be distributed by senders.

The recovery process, however, may not guarantee that all messages are recovered. For example, if the clocks of the senders are not synchronized, it is possible that after a recovery a recorder that assisted in the recovery process will have received a message with a timestamp that was earlier than the time used to start the recovery process. Moreover, if that message was the last message in a batch, the receiver would not detect the missing message if the batch had become inactive and therefore was not included in a heartbeat. To address this situation and any other anomalous situation in which a receiver may not detect a missing message, the message system allows receivers to reconcile their messages by requesting a recorder to provide a heartbeat covering for all (i.e., active and inactive) batches, rather than just active batches. When a receiver receives a heartbeat covering all batches, the receiver can process the heartbeat in the same way that it processes a heartbeat for only active batches. In one embodiment, a receiver requests such a heartbeat whenever recovery is complete.

In one embodiment, the message system may allow applications to perform data store (e.g., catalog) recovery. When a computer system (e.g., a web server) comes online, it may have no data. In such a case, it may request another instance of the application to provide it with a copy of its data store. Once the copy has been received, the application can start processing the message content provided by its receiver. In this way, computer systems can be brought online and control the initialization of their data stores.

In one embodiment, the message system may allow a receiver to initiate a recovery process starting at an arbitrary time. For example, the receiver may provide its messages to an application that allows a user to view all the price changes made to a catalog during a certain period (e.g., in the last 24 hours). In such a case, the receiver may send a request to a recorder for the state of all active batches within an arbitrary period designated by the user. The state identifies each batch along with its last sequence number and timestamp. The receiver then updates its state information to reflect the current state of each batch. It then initiates a recovery process starting at the selected time followed by a request for a heartbeat covering active and inactive batches. Performing a recovery from an arbitrary time can also be used in an environment in which a master catalog is periodically built and distributed to receivers. In such a situation, the catalog would have a build time indicating the effective time of the information in the catalog. After replacing its copy of the catalog, a receiver could request to recover any message sent since the build time to make the catalog current.

FIG. 1 is a block diagram illustrating the message system in one embodiment. The message system comprises the components that execute on senders 110, nonrecording receivers 120, and recording receivers 130. The senders and receivers transmit information via a communications channel 140. The communications channel may support the broadcasting, multicasting, or unicasting of information. "Broadcasting" generally refers to transmitting a communication that is not addressed to any specific receiver but may be received by any receiver that is listening. "Multicasting" generally refers to transmitting a communication that is addressed to a specific set of receivers. "Unicasting" generally refers to transmitting a communication that is addressed to a single receiver. Broadcasting and multicasting generally do not guarantee delivery to all the intended receivers. Unicasting, in contrast, generally guarantees delivery to the intended receiver.

The senders include a message publisher component 111 that is responsible for multicasting messages in sequence to the receivers. Each sender uniquely identifies a message by a batch identifier and sequence number within a batch. The batch identifiers are randomly generated with a high probability of being unique. Each sender periodically generates a new batch identifier for its messages (e.g., if a message has not been sent within a certain time period) and when a transmission error is detected. Each receiver includes an event loop 121, a receive message component 122, a hole filler component 123, a recovery component 124, a reconciliation component 125, and a scorecard store 126. The event loop receives communications from the senders and other receivers and invokes the appropriate component for processing the communications. The receive message component is invoked when a message is received from a sender or recorder. The receive message component updates the scorecard store to track the messages that have been received for each batch and provides the messages to the application for further processing. The receive message component also detects holes in the batches and notifies the hole filler component of the hole so that a recorder can be requested to provide the missing messages. The hole filler component is responsible for requesting a recorder to provide the messages needed to fill the holes. The recovery component may be invoked at receiver startup to request a recorder to provide messages that have been missed while the receiver was down. The recorders periodically distribute heartbeats indicating the last sequence number received for each of the active batches along with the latest timestamp of a message received by the recorder. The reconciliation component is invoked when a heartbeat is received to determine whether the receiver may have missed any messages. If so, the receiver updates the scorecard store to track the holes and notifies the hole filler component.

Each recorder includes receiver components 131 and recorder components such as a hole filler volunteer component 132, a recovery volunteer component 133, a heartbeat volunteer component 134, a heartbeat component 135, and a message log 136. A recorder may be dedicated in the sense that it does not provide messages to an application. The receiver components of a recorder operate in a similar manner to the components of a nonrecording receiver except that messages received from a sender are acknowledged and logged. In one embodiment, the recorder components can be considered as an application associated with a receiver. In such a case, the recorder component may send an acknowledgement and log the message. The heartbeat component periodically distributes heartbeats to the other receivers that identify the last sequence number received for each active batch along with the latest timestamp of a message received by the recorder. Occasionally, the heartbeat may include information for all inactive and active batches. The hole filler volunteer component and recovery volunteer component provide missed messages to receivers. The heartbeat volunteer component provides a heartbeat to a receiver covering all active and inactive batches when a request is received from that receiver. The message log contains an entry for each message received by the recorder. The entry contains the batch identifier, sequence number, timestamp, and the message itself. Although not shown, a recorder may also have a janitor component that deletes messages from the message log after a certain period (e.g., seven days after their timestamp). Once all the messages of a batch have been removed from the message log, the batch is referred to as "expired." (A batch thus has three states: active, inactive, and expired.) Each receiver can periodically update its scorecard store to remove data for batches that are expired.

The computer systems of the message system may include a central processing unit, memory, input devices (e.g., keyboard and pointing devices), output devices (e.g., display devices), and storage devices (e.g., disk drives). The memory and storage devices are computer-readable media that may contain instructions that implement the message system. In addition, the data structures and message structures may be stored or transmitted via a data transmission medium, such as a signal on a communications channel. Various communications channels may be used, such as the Internet, a local area network, a wide area network, or a point-to-point dial-up connection. The functions and data of the message system can be organized in many different ways. In the following, the functions and the data of the message system are illustrated by one possible organization of components and data stores.

Figure 2:
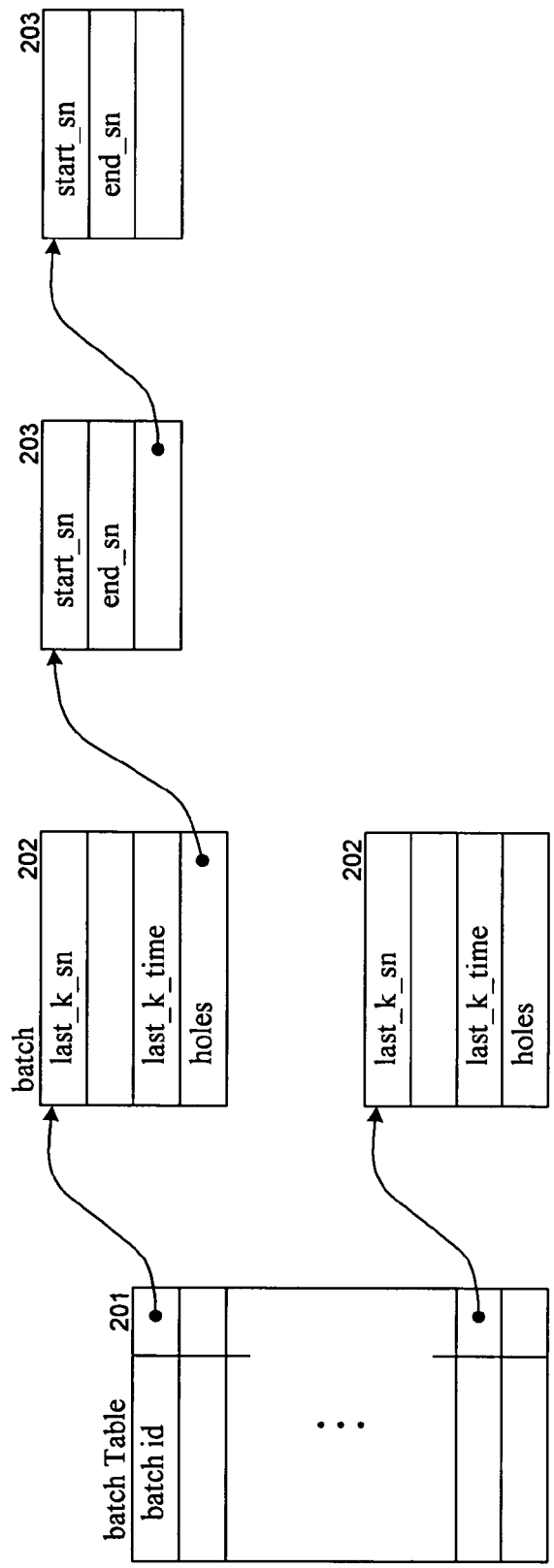
FIG. 2 is block diagram illustrating the organization of the scorecard data store of a receiver in one embodiment.

FIG. 2 is a block diagram illustrating the organization of the scorecard store in one embodiment. The scorecard store is used to track the messages that have been received and the messages that have been detected as missing. The receiver preferably periodically stores the scorecard data persistently. The scorecard store includes a batch table 201 containing an entry for each batch that has been received by the receiver. The entry contains the batch identifier along with a reference to a batch data structure 202. The batch data structure contains the highest known sequence number of a message for that batch and its timestamp, which may relate to a received message or a message reported in a heartbeat. The batch data structure contains a reference to the hole data structures for the batch. Each hole data structure contains the starting sequence number and ending sequence number (i.e., the missing messages) of a hole. The hole data structures may form a linked list.

Figure 3:
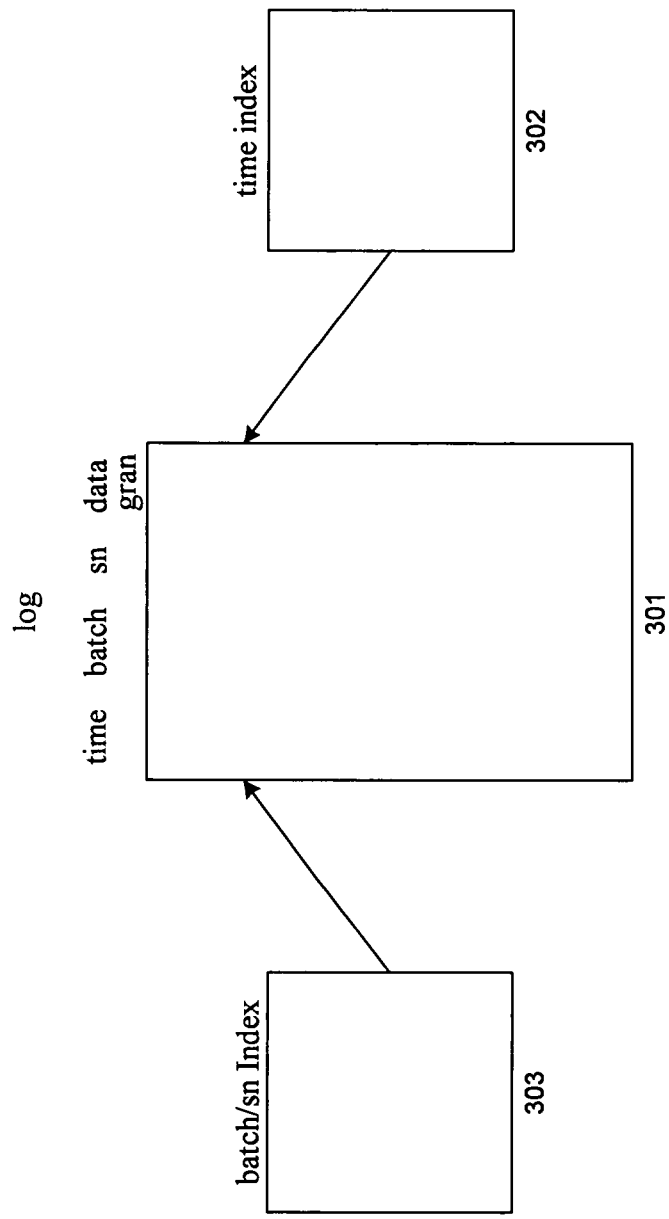
FIG. 3 is block diagram illustrating the message log of a recorder in one embodiment.

FIG. 3 is a block diagram illustrating the message log of a recorder in one embodiment. The message log 301 contains an entry for each message received by that recorder. Each entry contains the batch identifier, sequence number, timestamp, and the message itself. The message log may also have a time index 302 and a batch/sequence number index 303. The time index is used during recovery to quickly locate the message at which recovery is to start. The batch/sequence number index is used when a hole is being filled to quickly locate a specific message. A recorder may periodically delete or overwrite the oldest entries in the message log to prevent it from becoming full.

A. Sender Components

Figure 4:
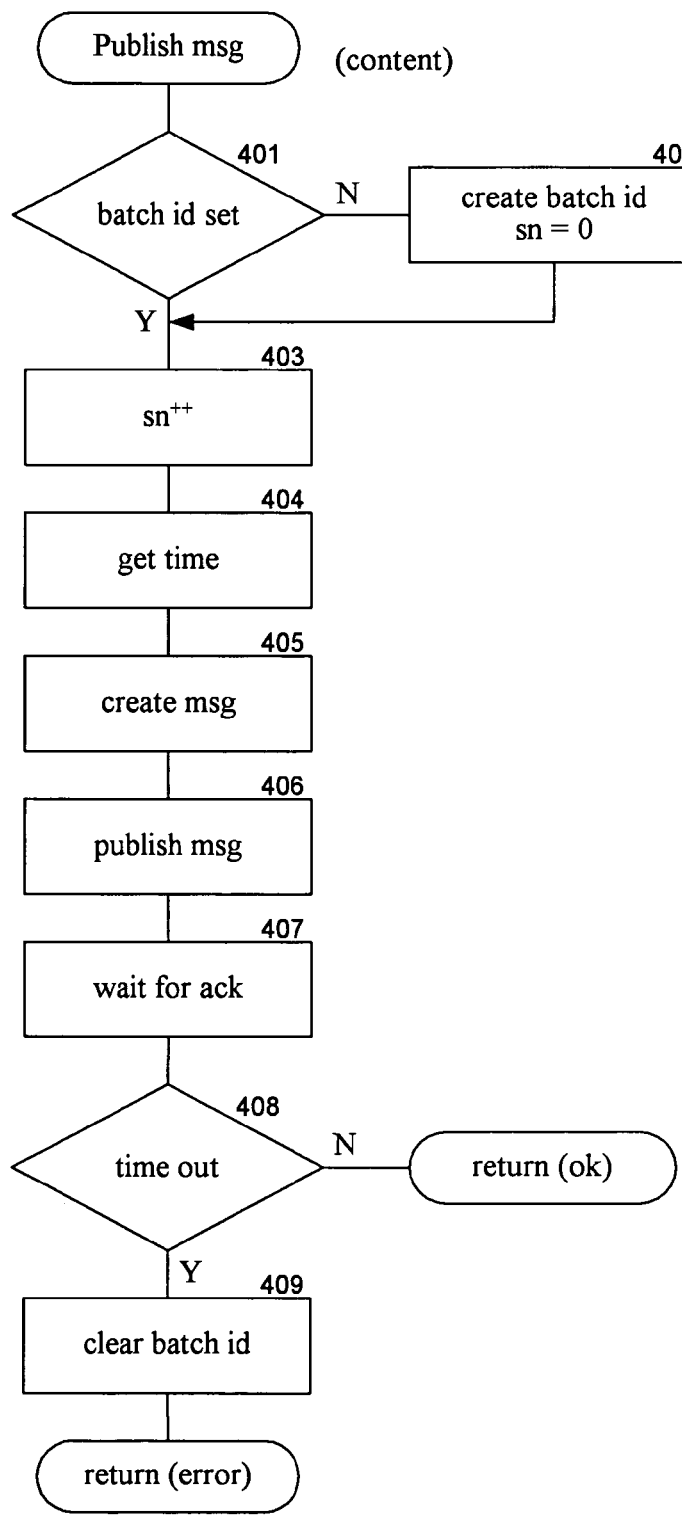
FIG. 4 is a flow diagram illustrating the processing of the publish message component of a sender in one embodiment.

FIG. 4 is a flow diagram illustrating the processing of the publish message component of a sender in one embodiment. The publish message component is invoked to distribute a message containing the passed message content to the receivers. For example, the component may be invoked by a catalog application to distribute updates to local copies of the catalog. In decision block 401, if the batch identifier is currently set, then the component continues at block 403, else the component continues at block 402. In block 402, the component creates a new batch identifier and sets the sequence number to zero. In block 403, the component increments the sequence number. In block 404, the component retrieves the current time. In block 405, the component creates a message that includes the batch identifier, the sequence number, the current time as the timestamp, and the passed message content. In block 406, the component publishes the message via the communications channel. In block 407, the component waits for an acknowledgement that the message was received and logged by a recorder or for a timeout. In decision block 408, if a timeout has occurred before the acknowledgement is received, then the component continues at block 409, else the component returns an indication that the message was successfully published. In block 409, the component clears the batch identifier to terminate the batch and start a new batch. The component then returns to the application an indication that an error was detected in publishing the message.

B. Receiver Components

1. Receive Message Components

Figure 5:
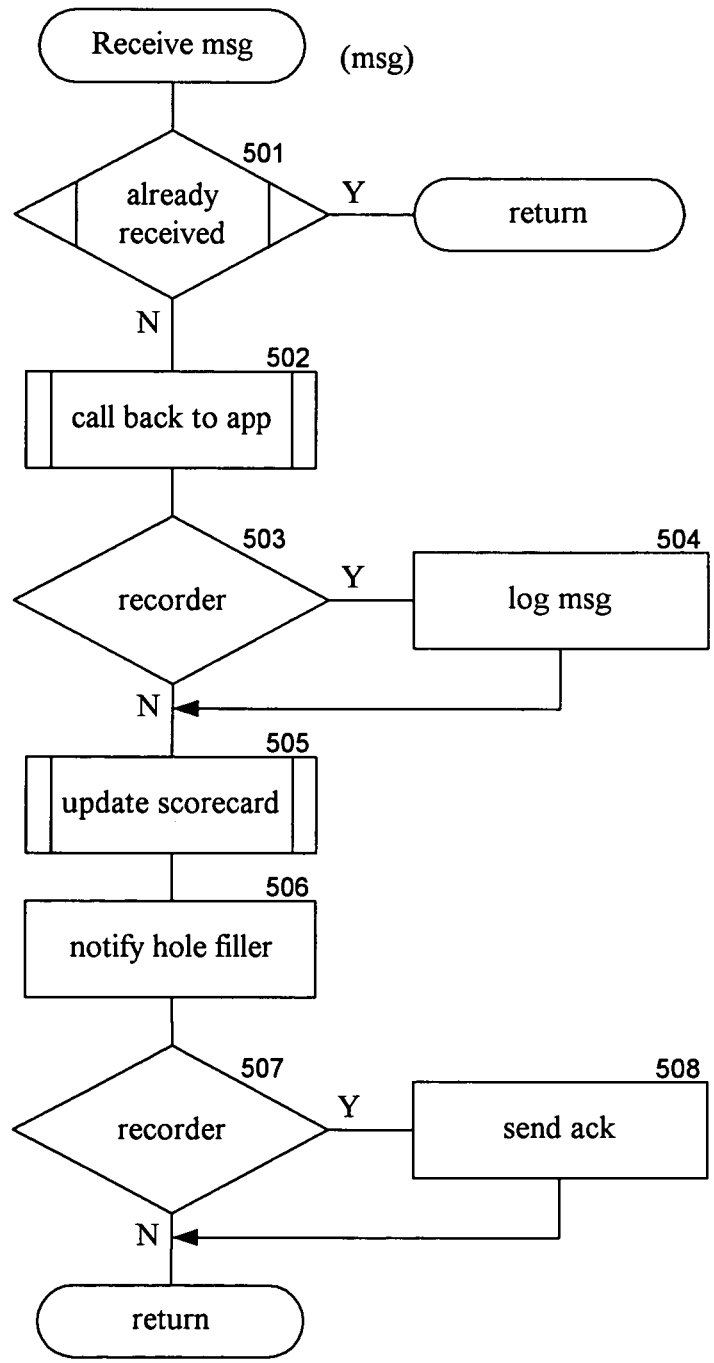
FIG. 5 is a flow diagram illustrating the processing of the receive message component of a receiver in one embodiment.

FIG. 5 is a flow diagram illustrating the processing of the receive message component of a receiver in one embodiment. The component is passed a message that has been received. The component determines whether the message has already been received. If not, the component provides the message to the application, updates the scorecard, and if the receiver is a recorder, logs the message and sends an acknowledgment. In decision block 501, if the message has already been received, then the component returns, else the component continues at block 502. In block 502, the component invokes a callback routine of the application passing the message. The application may register the callback routine when it initializes. One skilled in the art would appreciate that the component could provide each message to multiple applications that each registered their callback routines. In one embodiment, a recorder may be dedicated to recording and not have an associated application. In such a case, the recorder would skip the callback. In decision block 503, if the receiver is a recorder, then the component continues at block 504, else the component continues at block 505. In block 504, the component invokes the log message component to log the message. In block 505, the component invokes a component to update the scorecard store. In block 506, the component notifies the hole filler component if a new hole is detected or a missing message has been received. The hole filler component maintains a hole work list that contains a hole work item for each hole. Each hole work item includes information describing the hole and a work time indicating when a request to fill the hole should next be sent to a recorder. Upon receiving notification that a new hole is detected, the hole filler component adds a hole work item to the hole work list. Upon receiving notification that a missing message has been received, the hole filler component adjusts (e.g., splits or removes) the appropriate hole work item. The hole work list may be sorted by work time. In decision block 507, if the receiver is a recorder, then the component continues at block 508, else the component returns. In block 508, the component sends an acknowledgment to the sender and then returns. One skilled in the art will appreciate, however, that an acknowledgement would not be needed if the message was received from another recorder as part of the hole filling or recovery process.

Figure 6:
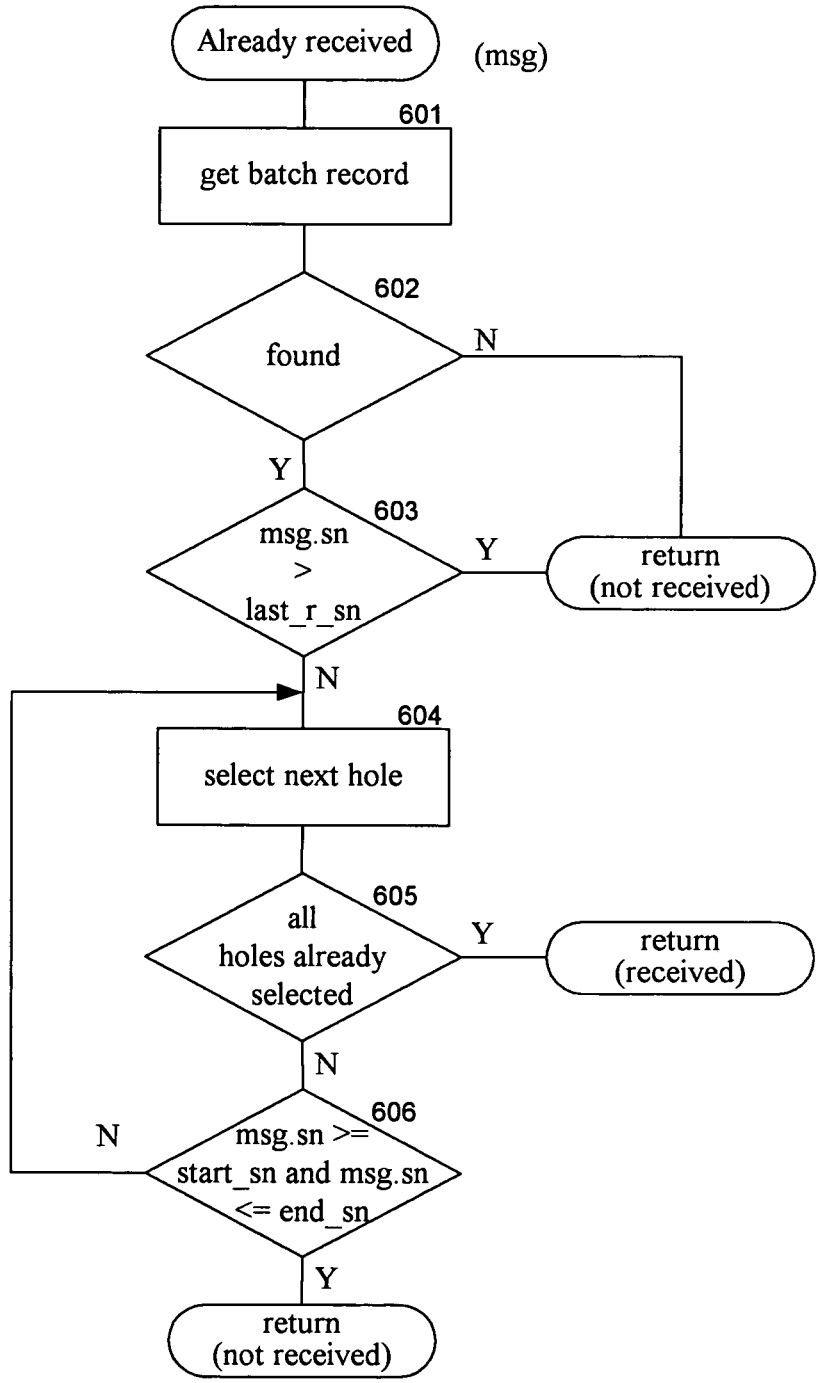
FIG. 6 is a flow diagram illustrating the processing of a component that checks to see whether a message has already been received.

FIG. 6 is a flow diagram illustrating the processing of a component that checks to see whether a message has already been received. The component is passed a message that has recently been received and returns an indication of whether the message has previously been received as indicated by the scorecard store. In block 601, the component retrieves the batch data structure from the scorecard store for the batch identified by the passed message. In decision block 602, if the batch data structure was retrieved, then the component continues to block 603, else the message is the first message received for a new batch and the component returns an indication that the message has not been received. In decision block 603, if the sequence number of the message is greater than the highest sequence number received for the batch, then the component returns an indication that the message has not been received, else the component continues at block 604. In blocks 604-606, the component loops, determining whether the message is within a hole. In block 604, the component selects the next hole data structure for the batch. In decision block 605, if all the hole data structures have already been selected, then the component returns an indication that the message has previously been received, else the component continues at block 606. In decision block 606, if the sequence number of the message is within the hole, then the component returns an indication that the message has not previously been received, else the message loops to block 604 to select the next hole data structure.

Figure 7:
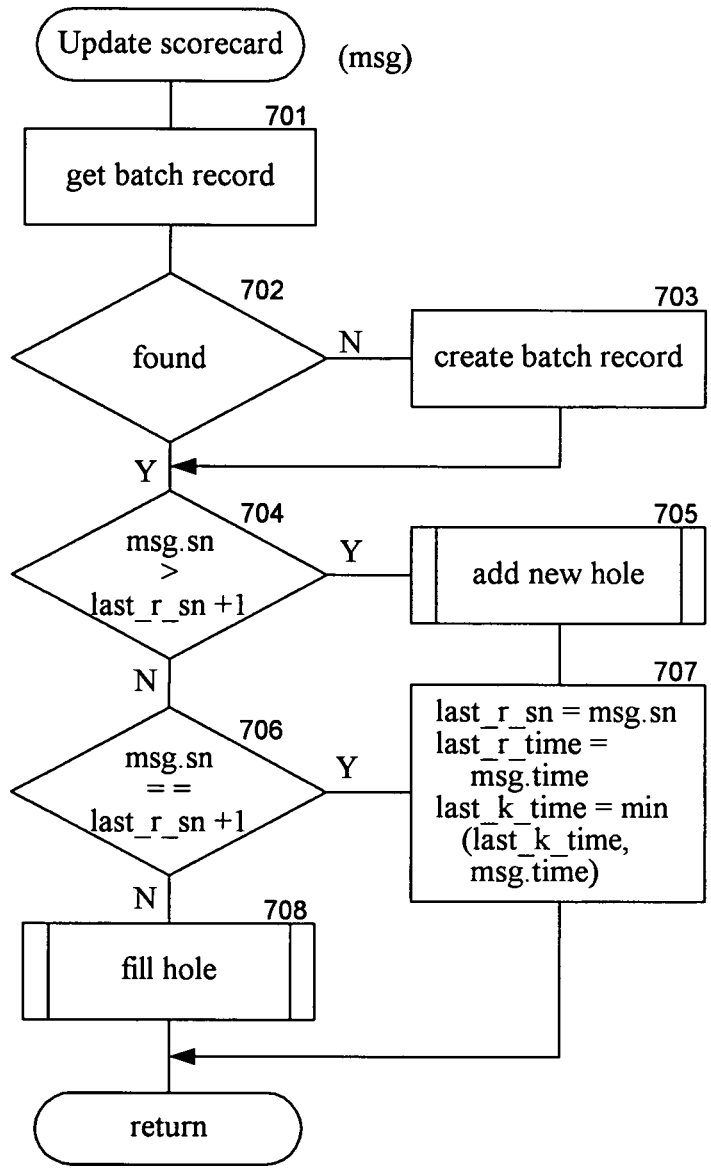
FIG. 7 is a flow diagram illustrating the processing of a component to update the scorecard in one embodiment.

FIG. 7 is a flow diagram illustrating the processing of a component to update the scorecard in one embodiment. The component is passed a message and updates the scorecard to reflect that the message has been received. In block 701, the component retrieves the batch data structure for the batch identified by the message. In decision block 702, if the batch data structure was retrieved, then the component continues at block 704, else this is the first message received for the batch and the component continues at block 703. In block 703, the component creates a batch data structure for the batch identified by the message. The highest sequence number received for the batch is set to zero. In decision block 704, if the sequence number of the message is greater than the next expected sequence number for the batch, then a hole has been detected and the component continues at block 705, else the component continues at block 706. In block 705, the component invokes another component to add a new hole for the batch. In decision block 706, if the sequence number is equal to the next expected sequence number for, the batch, then the component continues at block 707, else a missing message has been received and the component continues at block 708. In block 707, the component updates the highest received sequence number and timestamp for the batch and adjusts the highest known timestamp for the batch, if appropriate, and then returns. In block 708, the component invokes another component to fill a hole and then returns.

Figure 8:
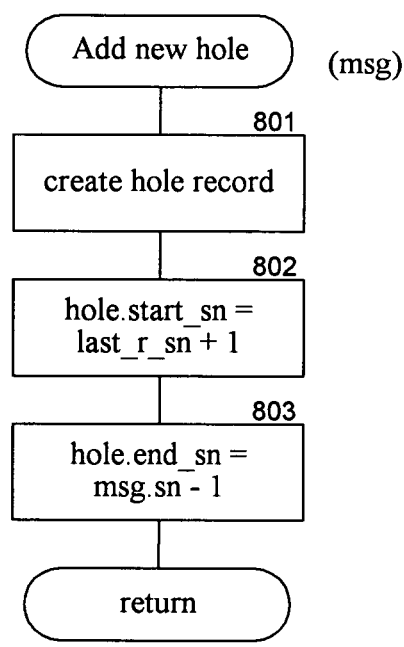
FIG. 8 is a flow diagram illustrating the processing of a component to add a new hole to a batch in one embodiment.

FIG. 8 is a flow diagram illustrating the processing of a component to add a new hole to a batch in one embodiment. The component is passed the message that resulted in the detection of the hole. In block 801, the component creates a hole data structure for the batch. In block 802, the component sets the starting sequence number of the hole to the next expected sequence number for the batch. In block 803, the component sets the ending sequence number of the hole to the sequence number of the message minus one. The component then returns.

Figure 9:
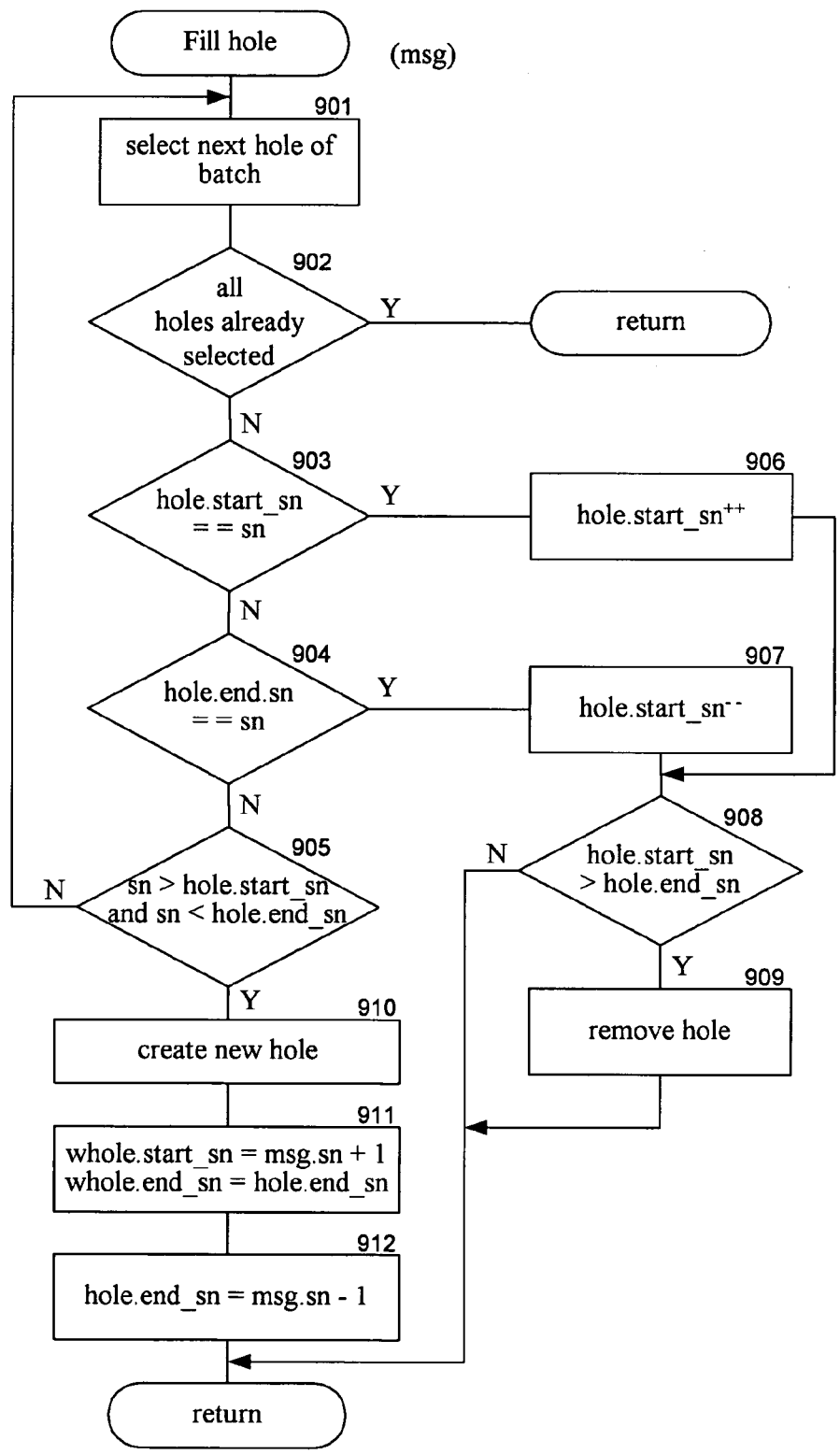
FIG. 9 is a flow diagram illustrating the processing of a component to record that a hole is filled when a missing message is received.

FIG. 9 is a flow diagram illustrating the processing of a component to record that a hole is filled when a missing message is received. The component is passed the message that has been received and searches for the corresponding hole data structure. The component either adjusts or splits the hole data structure. If the hole data structure is adjusted, it is removed if the passed message was the only remaining message of the hole. In blocks 901-905, the component loops, searching for the hole data structure that contains the passed message. In block 901, the component selects the next hole data structure of the batch. In decision block 902, if all the hole data structures of the batch have already been selected, then the component returns, else the component continues at block 903. In decision block 903, if the passed message is at the start of the hole, then the component continues at block 906, else the component continues at block 904. In decision block 904, if the passed message is at the end of the hole, then the component continues at block 907, else the component continues at block 905. In decision block 905, if the passed message is within the hole, then the hole data structure needs to be split and the component continues at block 910, else the component loops to block 901 to select the next hole data structure of the batch. In block 906, the component increments the start sequence number of the hole to reflect that the first missing message of the hole has been received. In block 907, the component decrements the end sequence number of the hole to reflect that the last missing message of the hole has been received. In decision block 908, if the start sequence number of the hole is greater than the end sequence number of the hole, then all the messages of the hole have been received and the component continues at block 909, else the component returns. In block 909, the component removes the hole data structure and then returns. In block 910, the component creates a new hole data structure when splitting a hole. In block 911, the component sets the start sequence number of the new hole to the sequence number of the message plus one and the end sequence number of the new hole to the end sequence number of the hole being split. In block 912, the component sets the end sequence number of the hole being split to one less than the sequence number of the passed message and then returns.

2. Hole Filler Components

Figure 10:
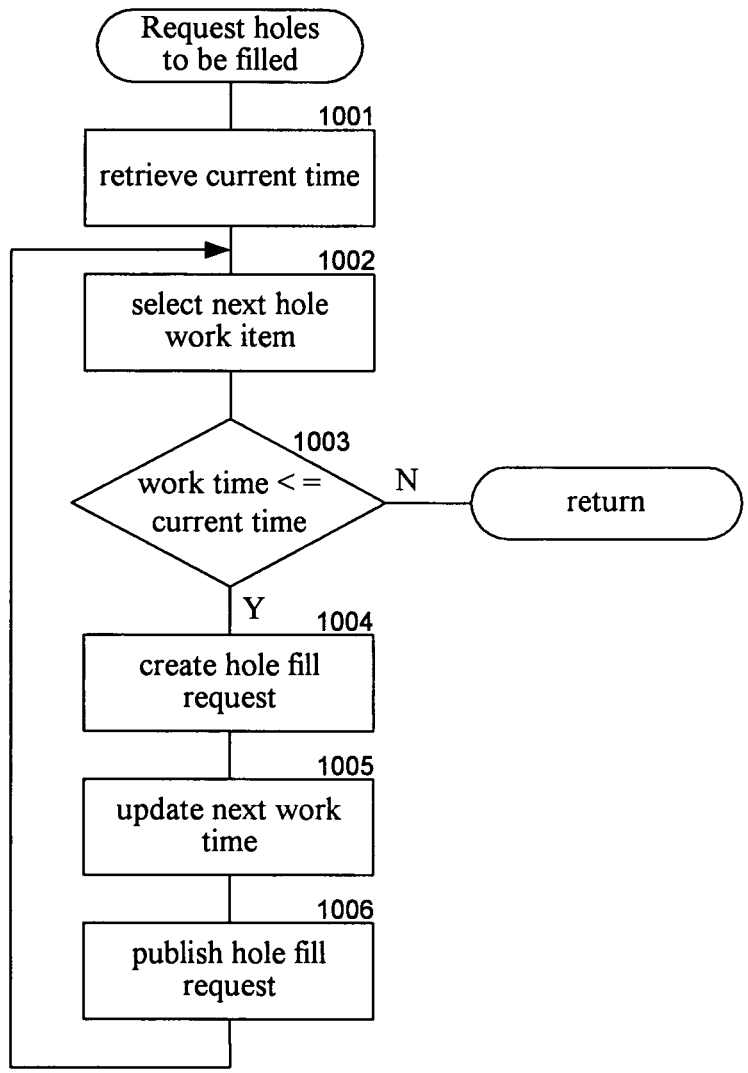
FIG. 10 is a flow diagram illustrating the processing of a component of a receiver to request a hole to be filled in one embodiment.

FIG. 10 is a flow diagram illustrating the processing of a component of a receiver to request a hole to be filled in one embodiment. This component may be invoked periodically to request holes to be filled. The component sends a request for each hole work item in the hole work list whose work time has passed. The component also resets the work time to indicate when the next request to fill the hole is to be sent in the event the hole is not filled before then. In one embodiment, the component may publish a separate request for each hole or each message within a hole. Alternatively, the component may group all the holes into a single request. In block 1001, the component retrieves the current time. In blocks 1002-1006, the component loops, selecting each hole work item whose work time has passed. In block 1002, the component selects the next hole work item in the sorted hole work list. In decision block 1003, if the work time of the selected hole work item has passed, then the component continues at block 1004 to send a request to fill the hole, else the component has already selected all hole work items whose work time has passed and then returns. In block 1004, the component creates a hole fill request. In block 1005, the component updates the work time for the selected hole work item. In one embodiment, the component sets the work time to an increasingly longer time so as not to continually publish requests when no recorder is currently available to respond. In block 1006, the component publishes the hole fill request and loops to block 1002 to select the next hole work item. When the receiver receives a response (e.g., via unicasting) to the request, it selects a responding recorder and sends to the selected recorder a request for the missing messages. When the receiver receives the missing messages, it passes them to the receive message component.

Figure 11:
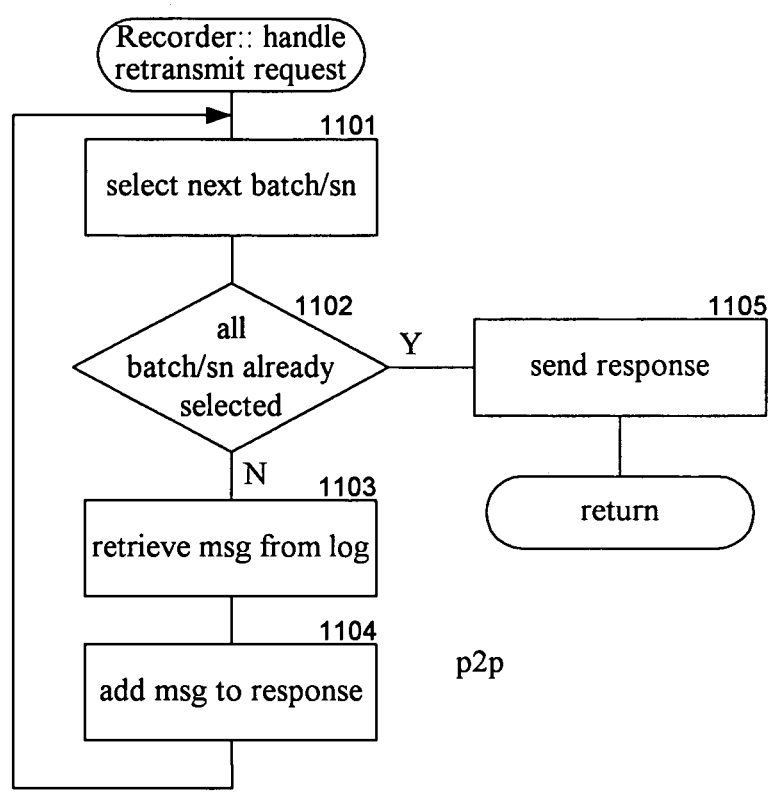
FIG. 11 is a flow diagram illustrating the processing of a handle hole fill request component of a recorder in one embodiment.

FIG. 11 is a flow diagram illustrating the processing of a handle hole fill request component of a recorder in one embodiment. When a recorder receives an indication that it has been selected to fill a hole, this component is invoked. Each recorder that can fill holes responds to the hole fill request, but only one is selected by the receiver. In block 1101, the component selects the next missing message of the hole fill request. In decision block 1102, if all the missing messages have already been selected, then the component continues at block 1105, else the component continues at block 1103. In block 1103, the component retrieves from the message log the message identified by the batch identifier and sequence number of the selected missing message. In block 1104, the component adds the retrieved message to the response. The component then loops to block 1101 to select the next missing message. In block 1105, the component sends the response to the requesting receiver via unicasting and returns.

3. Heartbeat and Reconciliation Components

Figure 12:
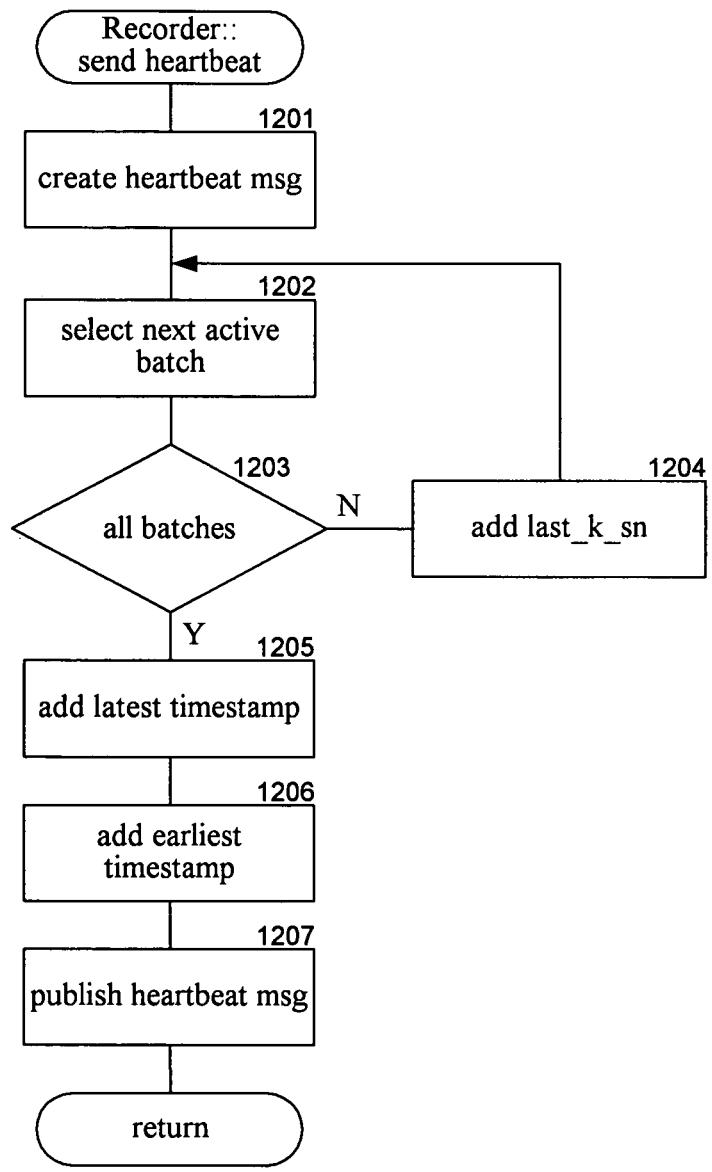
FIG. 12 is a flow diagram illustrating the processing of the send heartbeat component of a recorder in one embodiment.

FIG. 12 is a flow diagram illustrating the processing of the send heartbeat component of the recorder in one embodiment. This component is invoked periodically to publish to the receivers a heartbeat containing information describing the active batches. Occasionally, the component will include information for all active and inactive batches to help ensure that the receivers are aware of all messages that have been sent. In block 1201, the component creates a heartbeat. In blocks 1202-1204, the component loops, adding information for each active batch to the heartbeat. The recorder retrieves the information from its scorecard store. In block 1202, the component selects the next active batch. In decision block 1203, if all the active batches have already been selected, then the component continues at block 1205, else the component continues at block 1204. In block 1204, the component adds the highest known sequence number of the selected batch and its timestamp to the heartbeat and then loops to block 1202 to select the next active batch. In block 1205, the component adds the latest timestamp of a message in the recorder's message log to the heartbeat. In block 1206, the component adds the earliest timestamp of a message in the recorder's message log to the heartbeat. In block 1207, the component publishes the heartbeat to the receivers and then returns.

Figure 13:
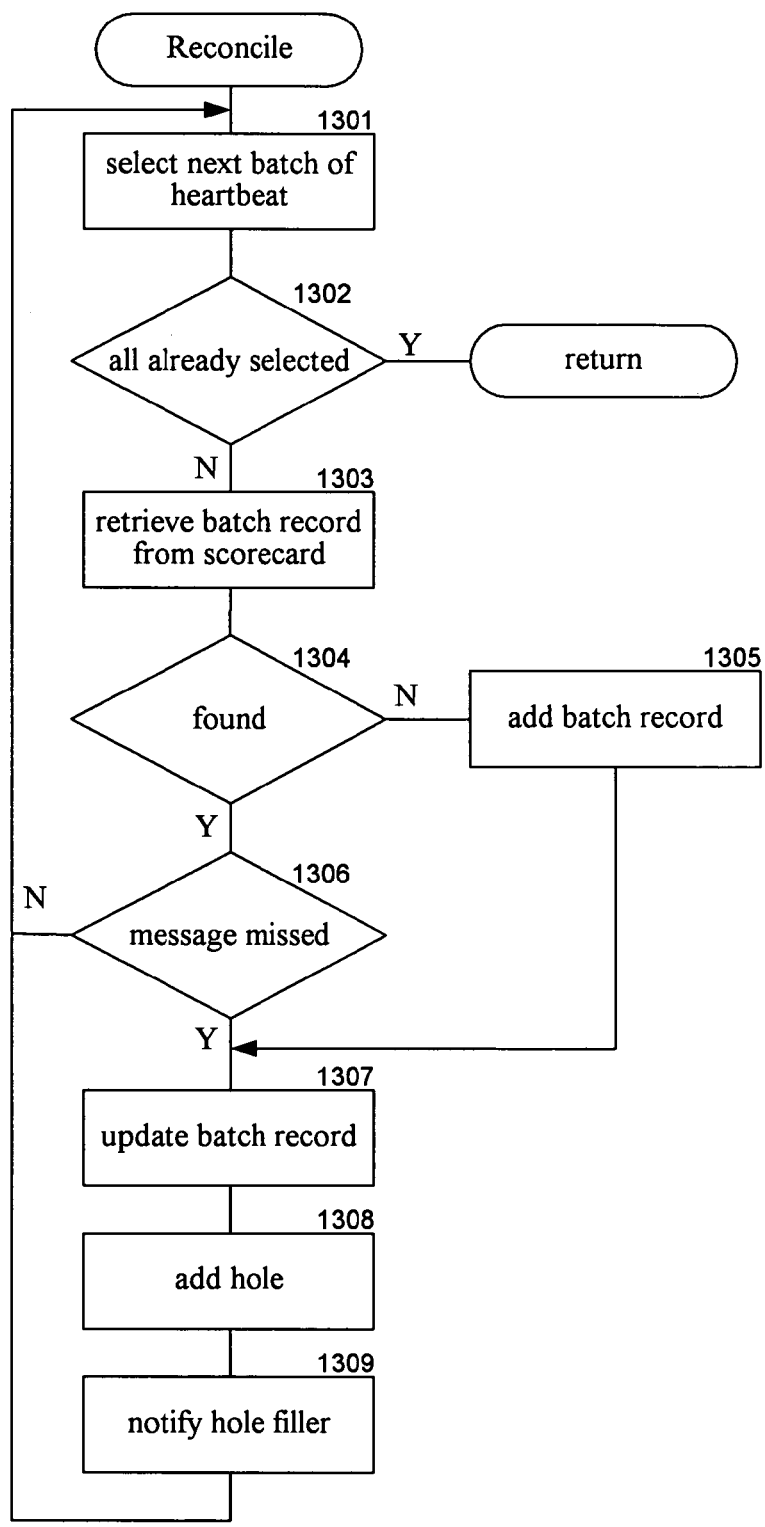
FIG. 13 is a flow diagram of the processing of the reconciliation component in one embodiment.

FIG. 13 is a flow diagram of the processing of the reconciliation component in one embodiment. The reconciliation component is invoked when a receiver receives a heartbeat that was sent by a recorder on a periodic basis or in response to a request from the receiver. The heartbeat may contain information only on active batches or on both active and inactive batches. The component detects whether the receiver has missed any messages at the end of a batch or if it missed an entire batch. If a message has been missed, the component updates the scorecard store and notifies the hole filler component. In block 1301, the component selects the next batch of the heartbeat. In decision block 1302, if all the batches of the heartbeat have already been selected, then the component completes, else the component continues at block 1303. In block 1303, the component retrieves the batch data structure for the selected batch from the scorecard store. In decision block 1304, if the batch data structure was retrieved, then the component continues at block 1306, else the batch is a new batch and the component continues at block 1305. In block 1305, the component adds a batch data structure to the scorecard store for the selected batch. In decision block 1306, if a message is missing from the selected batch, then the component continues at block 1307, else the component loops to block 1301 to select the next batch. In block 1307, the component updates the batch data structure of the scorecard store to indicate the time and possibly sequence number of the last known message for the batch. In block 1308, the component adds a hole data structure for the batch. In block 1309, the component notifies the hole filler component of the hole and then loops to block 1301 to select the next batch.

4. Recovery Components

Figure 14:
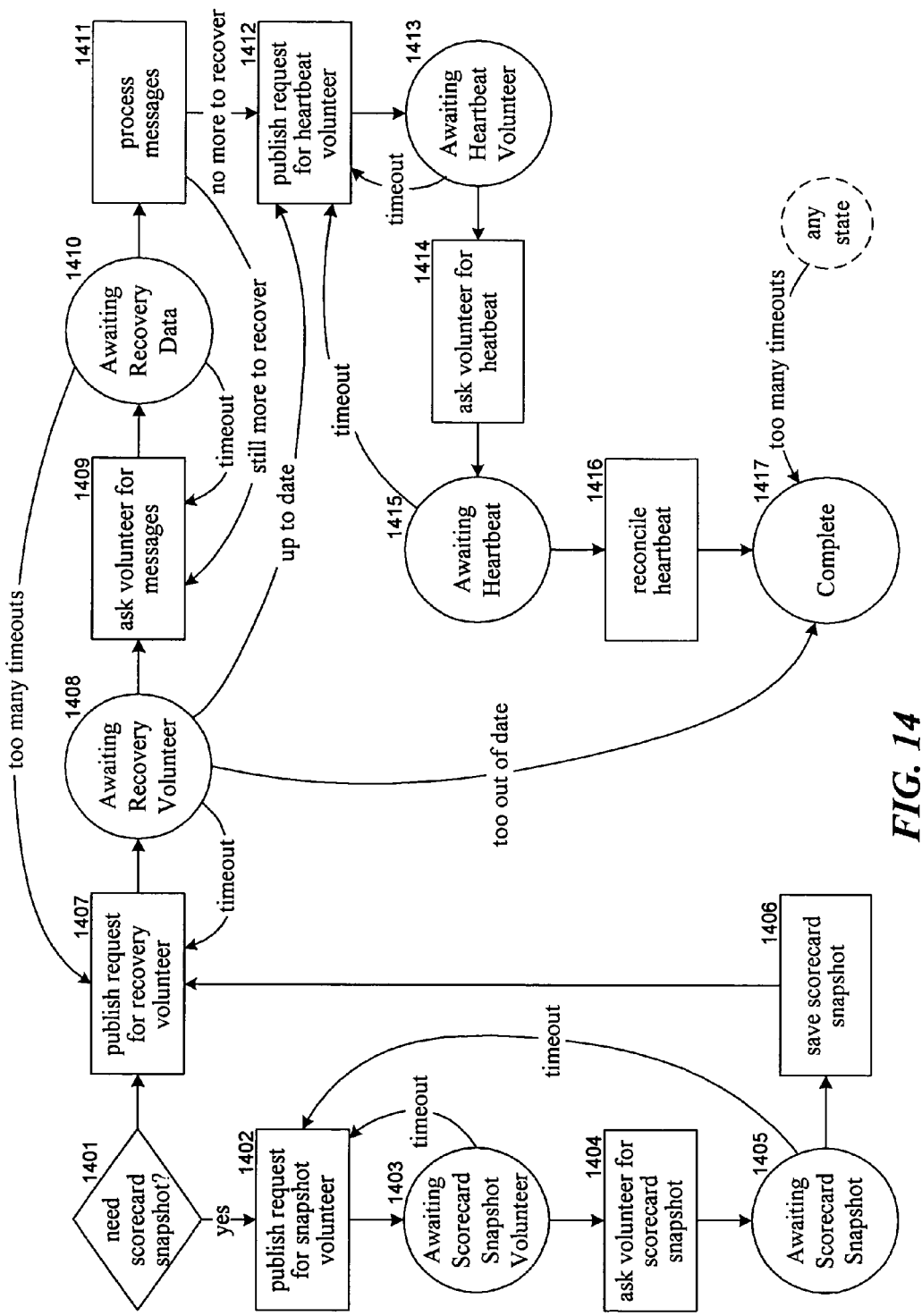
FIG. 14 is a diagram illustrating the overall processing of a receiver as it transitions through recovery.

FIG. 14 is a diagram illustrating the overall processing of a receiver as it transitions through recovery. The recovery component is invoked at receiver initialization or whenever the receiver decides a comprehensive recovery is needed starting at a certain time. The recovery component is passed an indication of a start time for the messages to be recovered and whether a snapshot of the scorecard store is needed. The snapshot is used to initialize the receiver's scorecard store. As indicated in decision block 1401, if a snapshot is needed, then the component continues at block 1402, else the component continues at block 1407. In block 1402, the component publishes to the recorders a request for a snapshot volunteer. In block 1403, the component enters a state waiting for a response. When a response is received, the component continues at block 1404. If a timeout occurs before a response is received, the component loops to block 1402. In block 1404, the component sends a snapshot request to the volunteer. In block 1405, the component enters a state waiting for a response. When a response is received, the component continues at block 1406. If a timeout occurs before a response is received, the component loops to block 1402. In block 1406, the component updates the scorecard store of the receiver. In block 1407, the component publishes a request for a recovery volunteer. In block 1408, the component enters a state waiting for a response. When a response is received, the component continues at block 1412 if the receiver is up-to-date, at block 1417 if the receiver is too out-of-date (e.g., some of the batches needed by the receiver are expired), or at block 1409 otherwise. If a timeout occurs before a response is received, then the component loops to block 1407. In block 1409, the component sends to the volunteer a request for the messages. In block 1410, the component enters a state waiting for a response. When a response is received, the component continues at block 1411. If a timeout occurs before a response is received, the component loops to block 1409. If too many timeouts occur before a response is received, the component loops to block 1407. In block 1411, the component processes the received messages. The component then loops to block 1409 if more messages need to be requested or continues at block 1412 if all the messages have been received. In block 1412, the component publishes a request for a heartbeat volunteer. In block 1413, the component enters a state waiting for a response. When a response is received, the component continues at block 1414. If a timeout occurs before a response is received, the component loops to block 1412. In block 1414, the component sends to the volunteer a request for a heartbeat. In block 1415, the component enters a state waiting for a response. When a response is received, the component continues at block 1416. If a timeout occurs before a response is received, the component loops to block 1412. In block 1416, the component performs reconciliation based on the heartbeat. In block 1417, the component enters a completion state. Unless indicated otherwise, if too many timeouts occur when in a state, the component enters the completion state.

Figure 15:
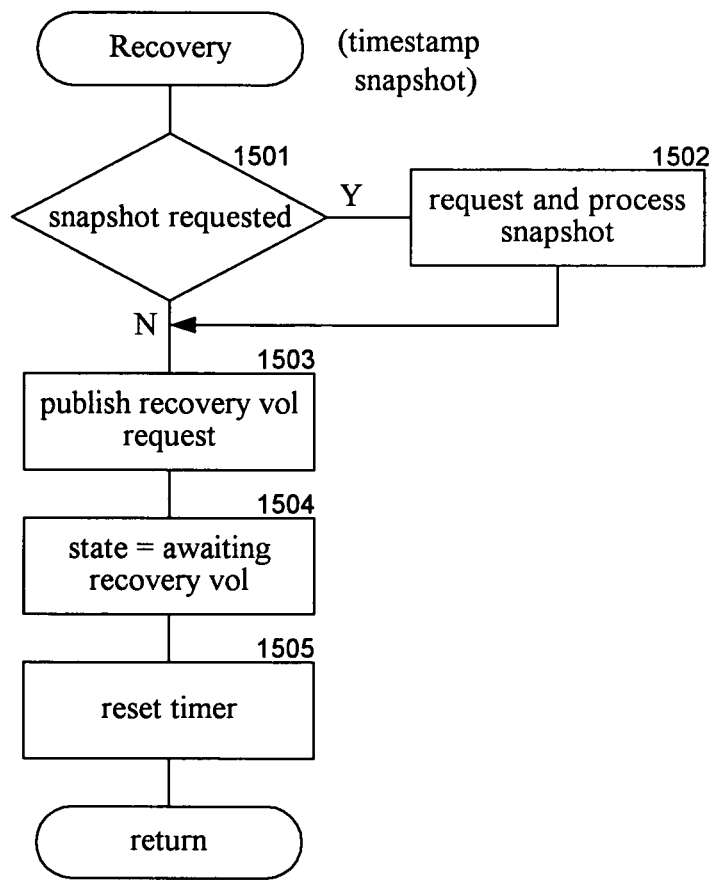
FIG. 15 is a flow diagram illustrating the processing of the recovery component in one embodiment.

FIG. 15 is a flow diagram illustrating the processing of the recovery component in one embodiment. The recovery component is passed a time and an indication of whether a snapshot of the scorecard store is needed. In decision block 1501, if a snapshot is being requested, then the component continues at block 1502, else the component continues at block 1503. In block 1502, the component locates a snapshot volunteer and requests the volunteer to provide a snapshot of the scorecard store at the passed time and then continues at block 1503. In block 1503, the component starts the recovery process by publishing a recovery volunteer request along with an indication of the passed timestamp. In block 1504, the component sets the state of the receiver to awaiting recovery volunteer. In block 1505, the component resets a timer to track whether a request has timed out by not receiving a response. As described below, the receiver takes an appropriate action based on the current state when a timeout occurs. The component then returns.

Figure 16:
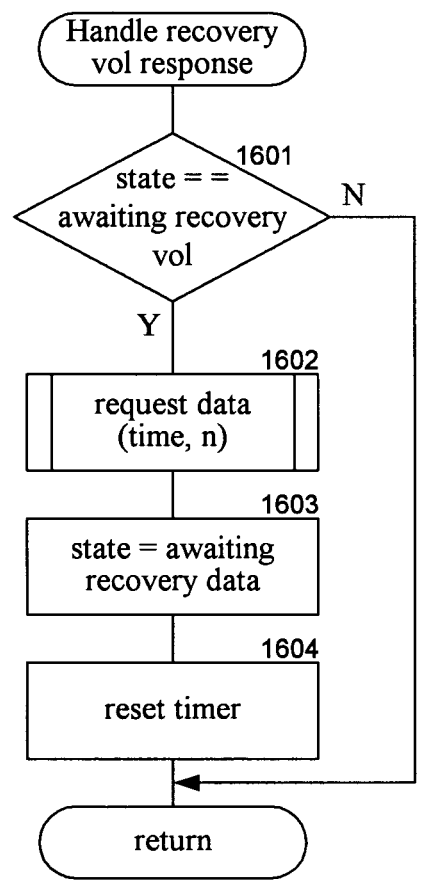
FIG. 16 is a flow diagram illustrating the processing of the handle recovery volunteer response component of a receiver in one embodiment.

FIG. 16 is a flow diagram illustrating the processing of the handle recovery volunteer response component of a receiver in one embodiment. This component is invoked when a recovery volunteer response is received from a recorder. In decision block 1601, if the state of the receiver is awaiting recovery volunteer, then the component continues at block 1602, else the component disregards the response and returns. In block 1602, the component invokes the request data component, passing an indication of the start time for the messages along with the number of messages to recover starting at that time. In one embodiment, the start time may be the later of the time passed when the recovery was initiated or the last time indicated in a heartbeat. The reconciliation based on the heartbeat should have accounted for all messages of active batches received before its last message. In block 1603, the component sets the state of the receiver to awaiting recovery data. In block 1604, the component resets the timer and then returns.

Figure 17:
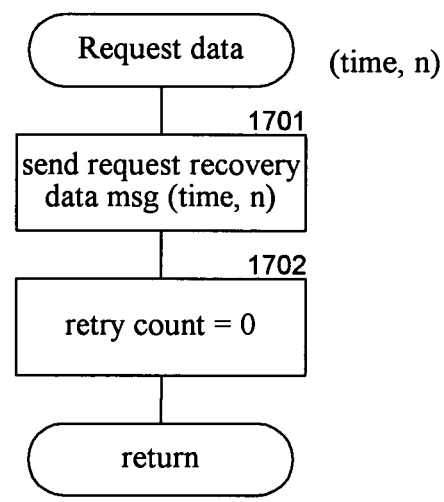
FIG. 17 is a flow diagram illustrating the processing of the request data component in one embodiment.

FIG. 17 is a flow diagram illustrating the processing of the request data component in one embodiment. The request data component is passed a time after which messages are to be recovered along with the number of messages that are to be recovered. In block 1701, the component sends a recovery data request to the volunteer recorder. In block 1702, the component sets the retry count to zero. The retry count tracks the number of times a particular request has been retransmitted because of a timeout. If a retry count limit is exceeded, the recovery process is restarted to reset the state of the volunteer recorder or to select a different volunteer recorder. The previously selected volunteer recorder may have become unavailable.

Figure 18:
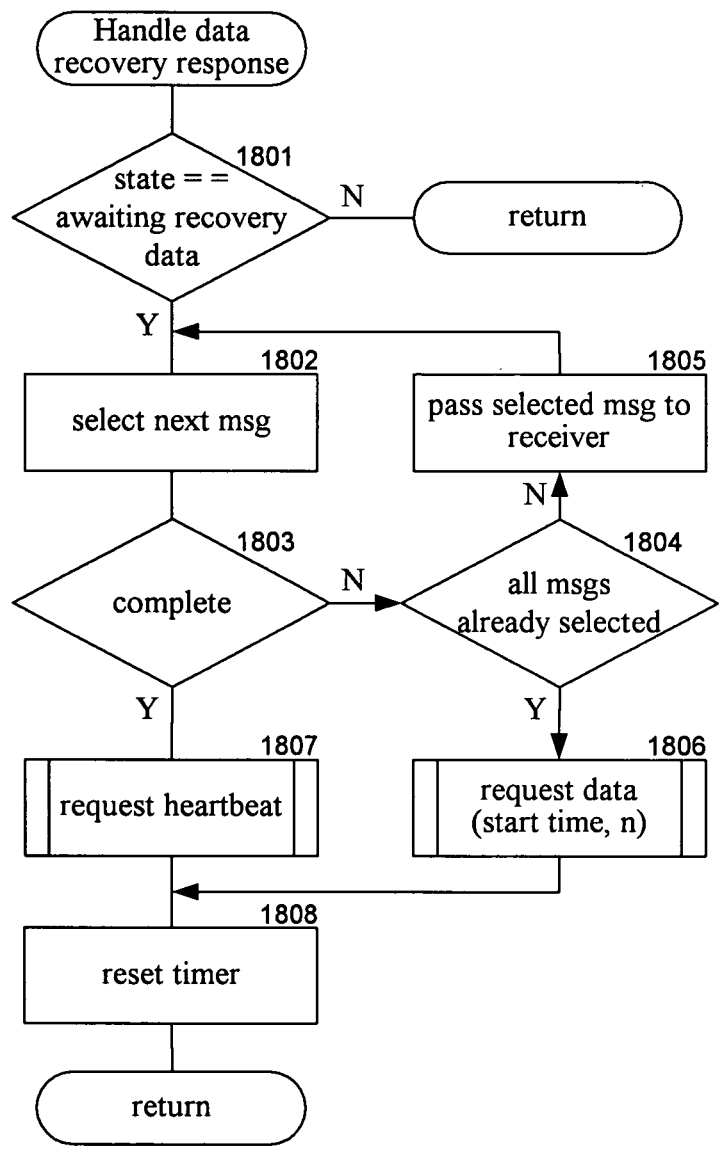
FIG. 18 is a flow diagram illustrating the processing of the handle recovery data response component of a receiver in one embodiment.

FIG. 18 is a flow diagram illustrating the processing of the handle recovery data response component of a receiver in one embodiment. In decision block 1801, if the state of the receiver is awaiting recovery data, then the component continues at block 1802, else the component disregards the response and returns. In blocks 1802-1805, the component loops, selecting the next message of the recovery data and passing it to the receive message component for processing as a normally received message. In block 1802, the component selects the next message of the recovery data. In decision block 1803, if recovery is complete, then the component continues at block 1807, else the component continues at block 1804. The recovery may be considered complete if the response indicates there are no more messages to send. Alternatively, the recovery component may have been passed a message stop time. In decision block 1804, if all the messages of the recovery data have already been selected, then the component continues at block 1806, else the component continues at block 1805. In block 1805, the component passes the selected message to the receive message component and loops to block 1802 to select the next message. In block 1806, the component invokes the request data component to request the next set of recovery data. In block 1807, the component invokes the request heartbeat component to get a heartbeat to be used in reconciliation. In block 1808, the component resets the timer and returns.

Figure 19:
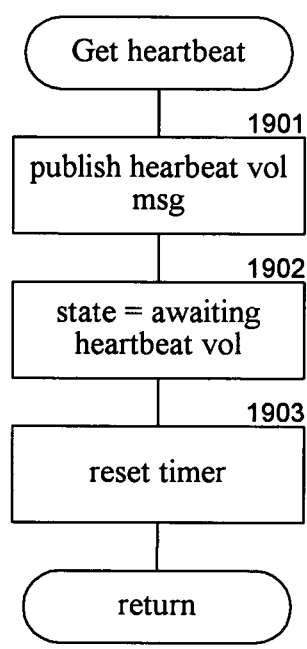
FIG. 19 is a flow diagram illustrating the processing of a request heartbeat component of a receiver in one embodiment.

FIG. 19 is a flow diagram illustrating the processing of a request heartbeat component of a receiver in one embodiment. In block 1901, the component starts the requesting of a heartbeat by publishing a heartbeat volunteer request. In block 1902, the component sets the state of the receiver to awaiting heartbeat volunteer. In block 1903, the component resets the timer and then returns.

Figure 20:
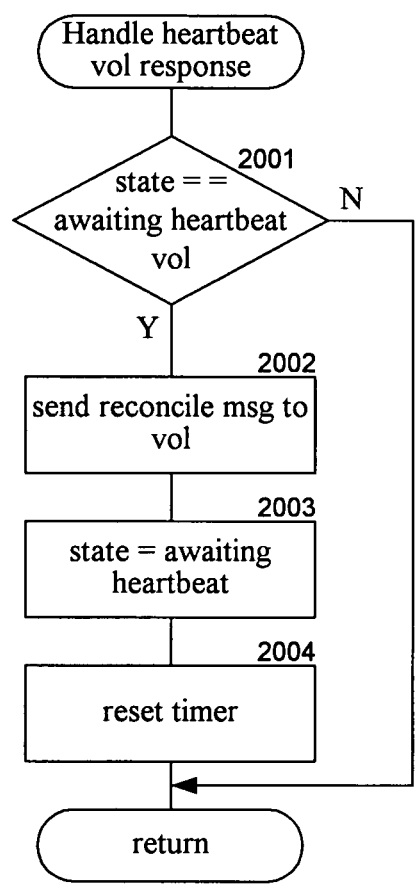
FIG. 20 is a flow diagram illustrating the processing of the handle heartbeat volunteer response component of a receiver in one embodiment.

FIG. 20 is a flow diagram illustrating the processing of the handle heartbeat volunteer response component of the receiver in one embodiment. In decision block 2001, if the state of the receiver is awaiting heartbeat volunteer, the component continues at block 2002, else the component disregards the response and returns. In block 2002, the component sends a heartbeat request to the volunteer recorder. In block 2003, the component sets the state to awaiting heartbeat. In block 2004, the component resets the timer and then returns.

Figure 21:
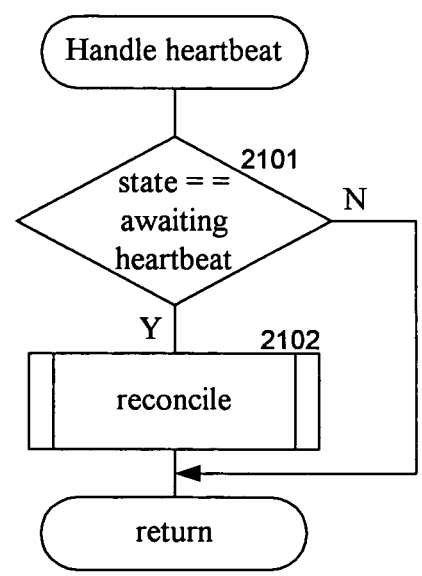
FIG. 21 is a flow diagram illustrating the processing of the handle heartbeat component of a receiver in one embodiment.

FIG. 21 is a flow diagram illustrating the processing of the handle heartbeat component of the receiver in one embodiment. In block 2101, if the state of the receiver is awaiting heartbeat, then the component continues at block 2102, else the component disregards the response and returns. In block 2102, the component invokes the reconciliation component to process as a normal heartbeat and then returns.

Figure 22:
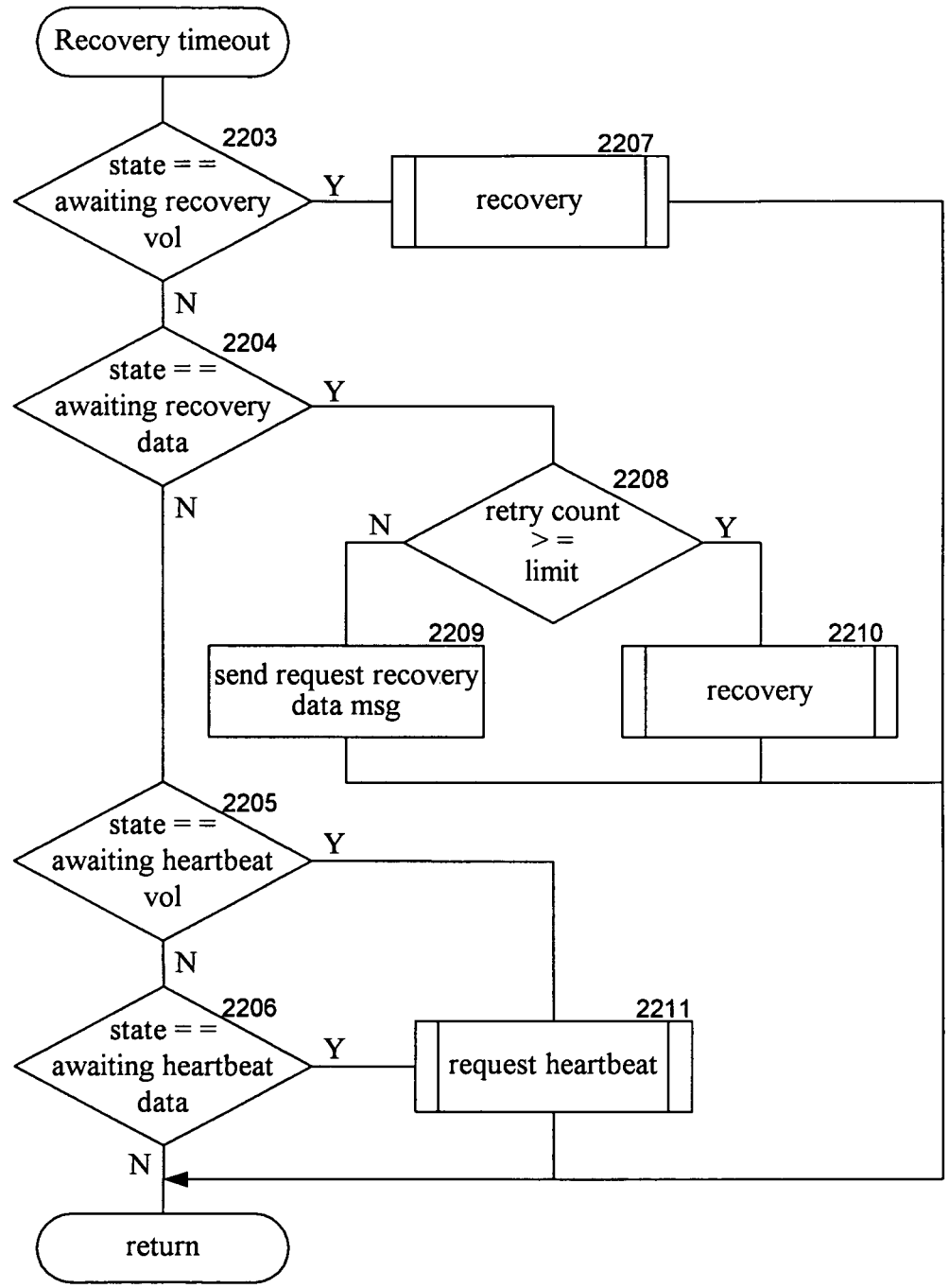
FIG. 22 is a flow diagram illustrating the processing of a recovery timeout component in one embodiment.

FIG. 22 is a flow diagram illustrating the processing of a recovery timeout component in one embodiment. In decision blocks 2202-2206, the component identifies the current state that has timed out and branches to perform the appropriate processing. In decision block 2203, if the state is awaiting recovery volunteer, then the component continues at block 2207, else the component continues at block 2204. In block 2207, the component invokes the recovery component to restart the recovery process and returns. In decision block 2204, if the state is awaiting recovery data, then the component continues at block 2208, else the component continues at block 2205. In decision block 2208, if the retry count has exceeded a retry limit, then the component restarts the recovery by invoking the recovery component in block 2210, else the component resends the recovery data request, increments the retry count, and resets the timeout in block 2209. The component then returns. In decision blocks 2205-2206, if the state is awaiting heartbeat volunteer or awaiting heartbeat, then the component restarts the requesting of a heartbeat by invoking the request heartbeat component in block 2211 and then returns.

Figure 23:
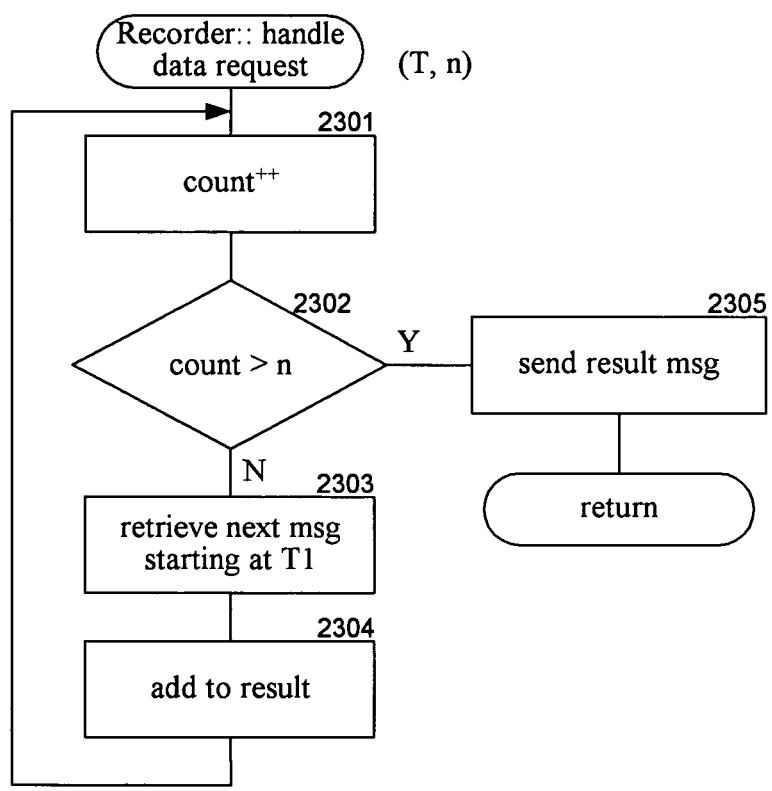
FIG. 23 is a flow diagram illustrating the processing of the handle data request component of a recorder in one embodiment.

FIG. 23 is a flow diagram illustrating the processing of the handle data request component of the recorder in one embodiment. The component is invoked when a recorder receives a recovery data request and is passed the starting timestamp and number of messages to recover. In blocks 2301-2304, the component loops, selecting the messages to be provided to the receiver. In block 2301, the component increments the count, which is initialized to zero. In decision block 2302, if the count is greater than the number of requested messages, then the component sends the recovery data response in block 2305 and returns. In block 2303, the component retrieves the next message starting at the passed timestamp. In block 2304, the component adds the message to the recovery data response and then loops to block 2301 to select the next message.

From the foregoing, it will be appreciated, that specific embodiments of the message system have been described herein for purposes of illustration, but various modifications may be made without deviating from the spirit and scope of the invention. For example, one skilled in the art will appreciate that the messages can be identified by message type or message class (e.g., price update class or inventory class). Each receiver can subscribe to receive certain classes of messages. In one embodiment, a batch contains messages of only one message class. Also, each sender or receiver may handle messages of only one message class. Alternatively, each sender and receiver can be implemented to handle messages of multiple message classes. In one embodiment, a recorder volunteers when it can provide at least one message of a hole and may optionally identify the messages it can provide. The requesting receiver can then select the appropriate recorder to provide the messages. Accordingly, the invention is not limited, except as by the appended claims.

We claim:

1. A method in a computing system for distributing messages to a set of receivers, the method comprising:
for each of the messages,
distributing the message to the set of receivers, wherein at least one receiver in the set of receivers corresponds to a recorder, wherein the recorder records each message received, and provides to at least one of the other receivers in the set of receivers any message not successfully received by the at least one of the other receivers in the set of receivers;
after distributing the message to the set of receivers, waiting for a direct acknowledgement of receipt of the message from the recorder, wherein the direct acknowledgment includes a communication from the recorder confirming receipt of the message;
only when a direct acknowledgement from the recorder is received, and without waiting for receipt of an acknowledgement from any other receiver, proceeding to distribute another message; and when a direct acknowledgement from the recorder is not received within a predetermined period of time, indicating a failure to distribute the message, and redistributing the message.

2. The method of claim 1 wherein each message is identified by batch identifier and sequence number within a batch and when the direct acknowledgement from the recorder is not received, the method further comprises generating a new batch identifier for distributing a subsequent message.

3. The method of claim 1 wherein each message is organized into a batch wherein a batch is terminated when receipt of a message of the batch is not directly acknowledged from a recorder.

4. The method of claim 1 wherein each message is organized into a batch representing a sequence of distributed messages whose receipt is directly acknowledged by the recorder.

5. The method of claim 1 wherein a subsequent message is distributed only after receiving the direct acknowledgement of receipt by the recorder of a last message that was distributed.

6. The method of claim 1 wherein the set of receivers corresponds to multiple recorders and wherein waiting for the direct acknowledgement of receipt of the message from the recorder includes waiting for a direct acknowledgement of receipt of the message from one of the multiple recorders.

7. The method of claim 6 wherein waiting for the direct acknowledgement of receipt of the message from the recorder includes waiting for a direct acknowledgement of receipt of the message from at least two of the multiple recorders.

8. The method of claim 6 wherein a receiver that did not receive a message identifies the recorder that is to provide the message.

9. The method of claim 8 wherein the receiver identifies the recorder by distributing a request to multiple recorders.

10. The method of claim 9 wherein the receiver distributes the request via broadcast.

11. The method of claim 9 wherein the receiver distributes the request via multicast.

12. The method of claim 8 wherein the identified recorder sends the message via unicast.

13. The method of claim 8 wherein the receiver that identifies a recorder is also a recorder.

14. The method of claim 1 wherein each message is distributed via broadcast.

15. The method of claim 1 wherein each message is distributed via multicast.

16. The method of claim 1 wherein each message is distributed via unicast.

17. A method in a computing system for distributing messages, the method comprising:
    distributing a message to a set of receivers, wherein at least one of the receivers corresponds to a recorder of sent messages, wherein the recorder sends a communication to a sender confirming receipt of the message;
    after distributing the message to the set of receivers, waiting for a direct acknowledgement of receipt of the message from one recorder;
    only when a direct acknowledgement from one recorder is received, and without waiting for receipt of an acknowledgement from any other receiver in the set of receivers, proceeding to distribute another message; and
    when a direct acknowledgement from one recorder is not received within a predetermined period of time, indicating a failure to distribute the message, and redistributing the message.

18. The method of claim 17 wherein a receiver detects that it has not received a message.

19. The method of claim 17 wherein the sender distributes messages via multicasting.

20. The method of claim 17 wherein the sender distributes messages via broadcasting.

21. The method of claim 18 wherein the receiver sends a request for a recorder who can provide the message via multicasting.

22. The method of claim 21 wherein the receiver sends the request that the recorder provide the message via unicasting.

23. The method of claim 22 wherein the recorder that is to provide the message sends the message via unicasting.

24. The method of claim 17 wherein the sender distributes a message only after an acknowledgement that the last sent message has been received by a recorder.

25. The method of claim 17 wherein the messages are distributed in order and when a message is received out of order, a receiver detects that it is missing a message.

26. The method of claim 25 wherein each message has a sequence number.

27. The method of claim 25 wherein the messages are sequential within a batch.

28. The method of claim 17 wherein each message has a timestamp and a receiver performs a recovery of messages by:
    sending to at least one recorder a request to provide messages with a timestamp after a specified time to respond; and
    after receiving from a recorder a response;
    sending to the recorder a request that the recorder is to provide the messages; and
    receiving from the recorder the messages.

29. The method of claim 28 wherein the receiver during recovery also requests from a recorder an indication of messages received by the recorder at the specified time.

30. The method of claim 28 wherein the messages received during recovery are grouped into multiple communications.

31. The method of claim 28 wherein recovery occurs at receiver initialization.

32. The method of claim 17 wherein each message has a timestamp and a receiver requests a recorder to provide messages with a timestamp after the time specified by the receiver.

33. A method in a computing system of a receiver for receiving messages comprising:
    receiving from a sender messages, each message having a sequence indicator;
    receiving from a recorder, wherein a recorder is solely responsible for acknowledging and recording each message received from the sender and for providing to at least one receiver any message not successfully received by the at least one receiver, a notification including an indication of the last active message received by the recorder; and
    after receiving a message from the sender,
        determining whether any message has been missed based on the sequence indicator of the received message from the sender and the notification received by the recorder; and
        when an active message has been missed,
            identifying a recorder who can provide the missed active message;

requesting the identified recorder to provide an indication that the missed active message may be provided; and when receiving, within a predetermined time period, the indication from the identified recorder indicating that the missed active message can be provided, sending to the identified recorder a request that the recorder provide the missed active message; and receiving the missed active message from the recorder;

when not receiving, within the predetermined time period, the indication from the identified recorder indicating that the missed active message can be provided, sending to at least one other recorder another request for a recorder to respond who can provide the missed active message.

34. The method of claim 33 wherein the received messages are provided to an application.

35. The method of claim 33 wherein the receiver that receives the messages is also a recorder.

36. The method of claim 33 further comprising:

periodically receiving from a recorder an indication of a highest sequence number of a message received by the recorder; and determining based on the received indication whether any messages are missing.

37. The method of claim 33 further comprising requesting a recorder to provide messages with a timestamp after a time specified by the receiver.

38. A system for distributing messages to a set of receivers, comprising:

a hardware computing system including a memory and a processor in communication with the memory, the processor configured to execute specific computer-executable instructions to provide;

a component implemented on the hardware computing system, wherein the component sends messages to the set of receivers and the component, after sending a message, waits for a direct acknowledgement of receipt of the message from one receiver in the set of receivers that is designated as a recorder, does not wait for an acknowledgment of receipt of the message from any other receiver in the set of receivers, and sends a subsequent message, and wherein the recorder records messages received and provides to at least one other receiver in the set of receivers any messages not successfully received by the at least one other receiver; and a component implemented on the hardware computing system, wherein the component, when the direct acknowledgement from the recorder is not received within the predetermined period of time, indicates a failure to distribute the message, and redistributes the message.

39. The system of claim 38 wherein the messages are identified by batch identifier and sequence number within a batch and when the direct acknowledgement from the recorder is not received, a new batch identifier for distributing subsequent messages is generated.

40. The system of claim 38 wherein messages are organized into batches, wherein a batch is terminated when receipt of a message of the batch is not directly acknowledged.

41. The system of claim 38 wherein multiple receivers are recorders and wherein waiting for the direct acknowledgment comprises waiting for a direct acknowledgement from at least two recorders.

42. The system of claim 41 wherein a receiver that did not receive a message identifies the recorder from the at least two recorders that is to provide the message.

43. The system of claim 38 wherein the receiver that identifies a recorder is also a recorder.

44. The method of claim 33, wherein the method further comprises receiving from a recorder a notification including an indication of the last inactive message received by the recorder.

\* \* \* \* \*